United States Patent
Berestov (10) Patent No.: US 6,671,399 B1
(45) Date of Patent: Dec. 30, 2003

(54) FAST EPIPOLAR LINE ADJUSTMENT OF STEREO PAIRS

(75) Inventor: Alexander Berestov, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/428,286

(22) Filed: Oct. 27, 1999

(51) Int. Cl.⁷ .................................................. G06K 9/00
(52) U.S. Cl. ...................................... 382/154; 345/419
(58) Field of Search ................................ 382/154, 209, 382/286, 287, 288, 289, 218; 345/419–427; 356/12; 348/42

(56) References Cited

U.S. PATENT DOCUMENTS

| | | | | |
|---|---|---|---|---|
| 5,016,173 A | * | 5/1991 | Kenet et al. | 382/128 |
| 5,220,441 A | * | 6/1993 | Gerstenberger | 358/487 |
| 5,432,712 A | * | 7/1995 | Chan | 382/191 |
| 6,125,198 A | * | 9/2000 | Onda | 382/154 |
| 6,191,809 B1 | * | 2/2001 | Hori et al. | 348/45 |

OTHER PUBLICATIONS

Yogesan, K., Eikelboom, R., and Barry, C. Colour Matching of Serial Retinal Images. Lions Eye Institute and Centre for Ophthalmology and Visual Science [online], Feb. 1999 [retrieved on Jun. 27, 2000]. Retrieved from the Internet:<URL: http://www.general.uwa.edu.au/u/robeik/OSA99/>.

Woods, A. et al;. *Image Distortions in Stereoscopic Video Systems*, SPIE vol. 1915 Stereoscopic Displays and Applications, pp 36–48, IV (1993).

* cited by examiner

Primary Examiner—Leo Boudreau
Assistant Examiner—Tom Y. Lu
(74) Attorney, Agent, or Firm—Fitzpatrick, Cella, Harper & Scinto (57) ABSTRACT

A method (500) adjusts the epipolar lines associated with two or more images (110,120) taken of the same scene such that the images (110,120) are and vertically aligned. The method (500) creates two or more search columns on the first image. The images (110,120) are split into grayscale sub-images corresponding to each color coordinate used to describe the color of a point in the image. A matching algorithm is applied to each point in the search column in each sub-image pair to calculate the vertical shift between the matched points. The shift values calculated for the matched points are then extrapolated across the entire image and used to align the points in the first (110) and second (120) image.

22 Claims, 7 Drawing Sheets (4 of 7 Drawing Sheet(s) Filed in Color)

FAST EPIPOLAR LINE ADJUSTMENT OF STEREO PAIRS

FIELD OF THE INVENTION

This invention pertains to the field of three-dimensional imaging and analysis. More specifically, the invention pertains to a system and method for epipolar line-to-line adjustment of stereo pairs.

BACKGROUND

For both real-world and computer-generated imaging applications, there is a growing need for display techniques that enable determination of relative spatial locations between objects in an image. This is particularly helpful for extracting the 3D topographical information from the stereo image pairs. Once the spatial relations are established, a user can move through the display space and manipulate objects easily and accurately.

One method used to determine spatial relations between objects is binocular stereo imaging. Binocular stereo imaging is the determination of the three-dimensional shape of visible surfaces in a static scene by using two or more two-dimensional images taken of the same scene by two cameras or by one camera at two different positions. Every given point A, in the first image, A, has a corresponding point, B, in the second image, which is constrained to lie on a line called the epipolar line of A. As soon as the correspondence between points in the images is determined, it is possible to recover a disparity field by using the displacement of corresponding points along the epipolar lines in the two images. For example, if two cameras are parallel, the disparity is inversely proportional to the distance from the object to the base line of the cameras. Thus, disparity approaches zero as depth approaches infinity. Once the disparity field is generated and the points in the images are matched, the spatial characteristics of the objects in the images can be calculated using Euclidean geometry.

A related problem in the field of stereo imaging is object recognition and localization. Object recognition and localization includes identifying an object or a particular class of objects, such as identifying a chair, and determining the location of the object in order to maneuver or manipulate the object accordingly. One of the first steps in computer object recognition is connecting as much information as possible about the spatial structure of the object from the analysis of the image. The spatial structure of the object is also important for many other applications, such as three-dimensional object modeling, vehicle navigation and geometric inspection.

Unfortunately, it is very difficult to recover three-dimensional information from a set of 2-d images as this information was lost when the two dimensional image was formed.

The present invention uses stereo imaging techniques to provide alternate views of the same object, thereby enabling determination of object characteristics, such as size and distance. The use of stereo imaging, however, does not resolve the problem associated with identifying the same object in different views, which is another problem requiring careful matching of points in the first image with points in the second image. The matching problem is compounded when the objects within the image are in motion.

In each of these cases, the matching problem can be simplified to a one-dimensional problem if the underlying epipolar geometry were known. What is further needed, then, is a system and method for determining the epipolar geometry between two or more images. Finally, a system and method for aligning the images to the same epipolar line is needed to complete the transformation.

DISCLOSURE OF INVENTION

The present invention provides a system and method for determining the epipolar geometry between two or more images (110),(120) taken of the same scene. First, points in the images (110),(120) are matched using an enhanced matching method (500). This method (500) provides highly accurate matching results while maintaining maximum I efficiency.

Once the points are matched, the images (110),(120) are adjusted so that the epipolar geometry of both images (110),(120) are aligned. The images (110),(120) may then be combined into a single stereo image. The present invention can then use other stereo imaging methods to provide alternate views of the same object, thereby enabling>determination of object characteristics, such as size and distance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The present invention can be used in conjunction with any number of different image capture devices including video cameras, video capture devices on personal computers, standard photographic cameras, specialty stereo imaging cameras or digital cameras. The present specification describes the invention as being used in conjunction with standard photographic cameras, for illustration purposes only.

Figure 1A:
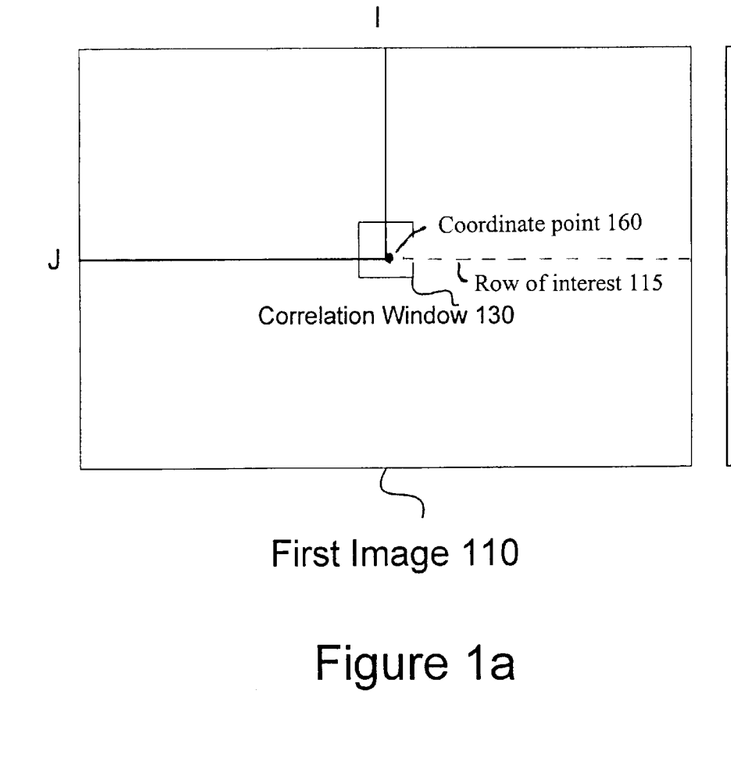
FIGS. 1a and 1b comprise two sample images that illustrate a preferred method for establishing match candidates among points in the images.
Figure 1B:
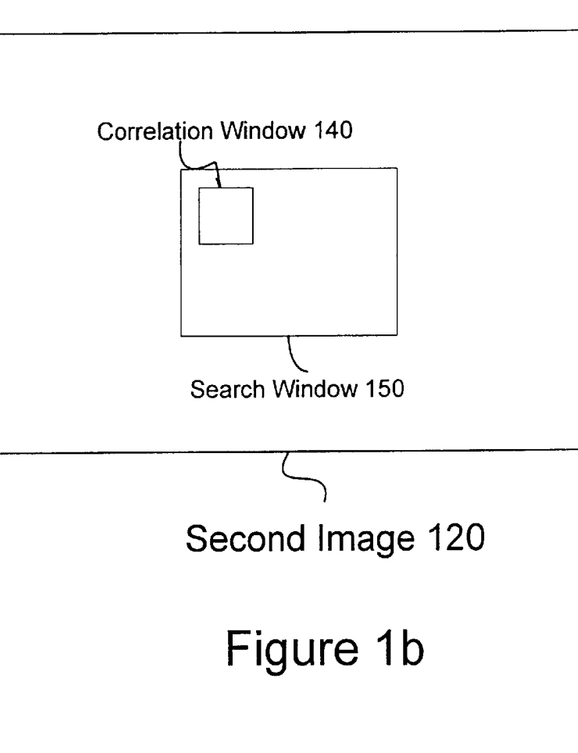

The standard still-frame camera is normally used to capture an image of a scene or object. When the picture is taken, however, the image of the scene is "flattened" from three dimensions to two dimensions resulting in the loss of information, such as spatial size and the spatial relations between objects in the image. One way of replacing the lost information is to take two or more images of the same object from different angles, called stereo images, and to extrapolate the spatial information accordingly. FIGS. 1a and 1b depict two sample images illustrating a preferred method for establishing match candidates among points in the images. In order to combine the images properly, however, portions of the first image 110 must be corresponded to the relevant portions in the second image 120.

It is often assumed that the stereo image correspondence problem is a one-dimensional search problem. This is true if the spatial relationships between the locations from which the images were taken, called the epipolar geometry, is known from the beginning. In the classical method, known as the calibrated route, both cameras (or viewpoints) are calibrated with respect to some world coordinate system. That information is then used to calculate the epipolar geometry by extracting the essential matrix of the system. The three-dimensional Euclidean structure of the imaged scene can then be computed.

If the two cameras are not carefully placed or are not absolutely similar to each other, however, recovery of the epipolar geometry is necessary. Recovery of the epipolar geometry is necessary, if it is desired to perform a more precise analysis whether the two images are taken with a moving camera or taken by a static camera in two locations. Thus, the system and method for recovering the epipolar geometry is useful in both contexts.

In the ideal case, the epipolar lines of the two images are horizontal. In order to guarantee horizontal epipolar lines, however, it is necessary to set the optical axes of the two cameras in parallel. For instance, calibration can be used to guarantee that the optical axes are parallel, the base line is horizontal, the sensors, which are used to create the image, coincide, and that the cameras have the same lens distortion. If any of these factors is incorrectly calibrated, however, the points in one image may not have matching points lying along the same row in the second image 120.

Matching points in one image 110 with points in another image 120 where both images are taken of a single scene, called the correspondence problem, remains one of the bottlenecks in computer vision and is important to continued development in this field. As will be more fully described below, the present invention adjusts the points in the second image 120 that correspond to the points in the first image 110, so that the points in the second image 120 are located along the same line as in the first image 110, thereby creating images with the desired epipolar geometry. As an initial matter, an understanding of a matching algorithm that is used in the preferred embodiment of the present invention is necessary. While this matching algorithm will be used to illustrate the preferred embodiment, those skilled in the art will realize that other matching algorithms may also be used to implement the present invention.

Referring now to FIGS. 1a and 1b two sample images 110,120 illustrating the technique for establishing match candidates are shown. For a given coordinate point 160($i,j$) in the first image 110, a correlation window 130 centered at the point 160 is created. Once the point 160 has been selected in the first image 110, a search window 150 is positioned around a point in the same, or similar, location in the second image 120. The size and position of the search window 150 may reflect some a priori knowledge about the disparities between the images 110,120 if desired. If no such knowledge is available, the whole image 120 may be searched.

Once the search window 150 bas been selected, a matching algorithm is performed. First, a correlation window 130 about the point 160 of interest in the first image 110 is created. The correlation window 130 maybe of any size but a larger window 130 will yield less precise results than a smaller window 130. The value of one or more properties of the area within the correlation window 130 of the first image 110 are then calculated. For example, the matching algorithm may use the amount of red in the points within the correlation window 130 as the relevant correlation property.

An equally sized correlation window 140 is then centered on points within the search window 150 in the second image 120. The value of one or more correlation properties of areas within the correlation window 140 of the second image 120 are then calculated. Each point within the search window 150 in the second image 120 is given a correlation score based on its similarity to the properties of the correlation window 130 of the first image 110.

A constraint on the correlation score can then be applied in order to select the most consistent matches: for a given couple of points to be considered as a match candidate, the correlation score must be higher than a given threshold, for example. Using the correlation technique, a point in the first image 110 may be paired to several points in the second image 120 and vice versa. Several techniques exist for resolving the matching ambiguities but, for simplicity, the points with the highest correlation score will be selected. Although the described algorithm is the preferred technique for matching the points in the images, other matching algorithms may also be used including: correlation-based matching, MRF-based matching, feature-based matching and phase-based matching.

Figure 2A:
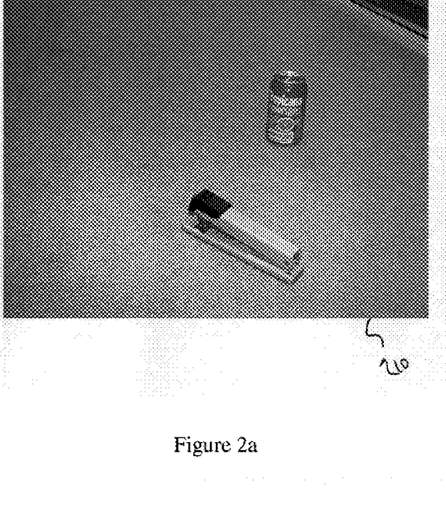
FIGS. 2a and 2b provide two images, each taken of the same scene from a different location, demonstrating the matching algorithm and the enhanced method of the present invention.
Figure 2B:
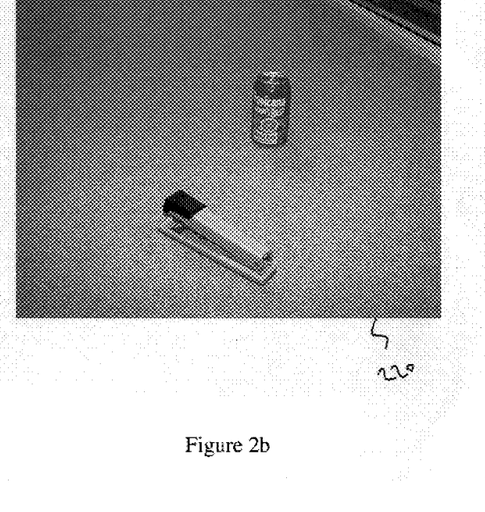

Referring flow to FIGS. 2a and 2b, an image pair of a can and stapler, each taken from a different location, is shown. This image pair will be used to demonstrate application of the matching algorithm and the enhanced method 500 of the present invention. As described above, the matching algorithm is performed in order to correspond a point in the first image 110 with a point in the second image 120.

Figure 3:
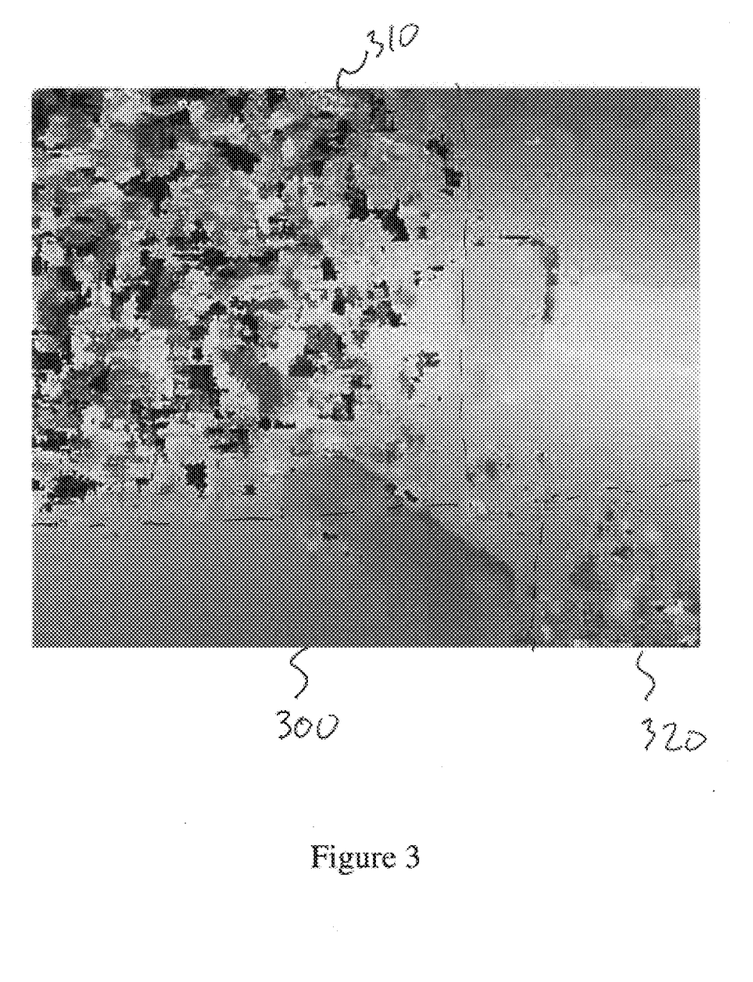
FIG. 3 is a red color disparity map generated from the can and stapler image pair shown in FIG. 2.

FIG. 3 is a red color disparity map generated from the application of the matching algorithm to the can and stapler image pair 210,220 illustrated in FIG. 2. A disparity map 300 is an image that graphically represents values assigned to a point or region in an indexed file, such as an image file. The disparity field values are the calculated distances between an image capture device and a location or object in that point of the image. Thus, every point in the image at some fixed distance away from the camera, such as 5 feet away, should be the same color in the disparity map.

The distances for this disparity map 300 were calculated by using the correlation method described above with reference to FIGS. 1a and 1b. In this example, the correlation window 130 was a 10×10 point window and the search window 150 covered every point in the same row in the second image 120 as the point being matched in the first image 110. The amount that a point in the second image 120 needed to be shifted in order to aligned with the point 160 in the first image 110 was used to determine its relative distance from the camera using Euclidean geometry.

The ideal result of this process is a disparity map 300 that has smooth transitions as the object in the image moves away from the camera. For example, the portion of the stapler that is away from the camera should be darker (assuming darker colors mean further distance) than the portion of the stapler that is toward the camera. Any significant deviations, i.e. portions of the disparity map 300 that have dark and light points all mixed together, represents miscalculations in the correlation method. As FIG. 3 illustrates, there is "noise" in the upper left 310 and bottom right corners 320 of the disparity map 300. The noise 310,320 is caused by image distortion and incorrectly selected epipolar lines.

Figure 4:
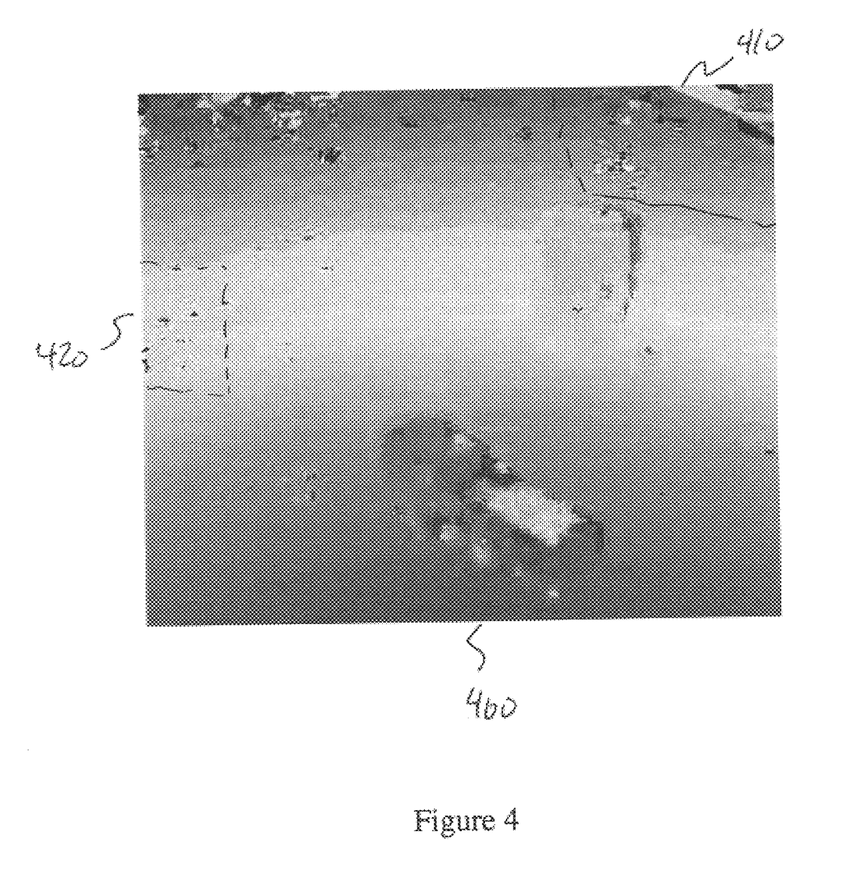
FIG. 4 illustrates improved red color disparity maps calculated by extending the search algorithm described in FIG. 2.

Referring now to FIG. 4, an improved red color disparity map 410 was generated by using a broadened search window 150. More specifically, the selection of points that serve as the center of the search window 150 in the second image 120 was extended to 7 rows above and below the point 160 corresponding to the row of interest its in the first image 110. This extended search area attempts to take account for the fact that vertical and horizontal distortion may have placed the "matching" point in the second image 120 in a different row than the point 160 in the first image 110.

As illustrated, some of the noise 410,420 in the corners disappeared and the result is better than the disparity map shown in FIG. 3. The reduced amount of noise 410,420 in the color disparity maps 400 indicates improved correlation between the images 110,120.

There are two disadvantages to this algorithm without further enhancement; speed and linear distortion. The algorithm can be slow because every point in the search window 150 must be compared to the point 160 being matched. This is particularly true when a better correlation is desired as the normal method for improving correlation necessitates using larger and larger search windows 150. This can be time intensive as the algorithm must calculate a correlation value for a correlation window 140 around an increasingly larger set of points in the search window 150.

The unmodified application of this algorithm can also cause linear distortion in the resulting image. Linear distortion results from the fact that the algorithm described approximates the vertical shift with an integer number and there are often regions in the image where this approximation is incorrect. When an image is converted into digital format, each point in the digital image is assigned a particular color. It may be the case, however, that the coordinate point 160 in the first image 110 actually represented by a combination of two points in the second image 120. For example, this would be the case if the second image 120 was captured by a camera that was improperly calibrated by three and a half points vertically upward. Since the algorithm compares the coordinate point 160 to a single point in the second image 120, the algorithm will choose either the point three points below the coordinate point 160 or will choose the point four points below the coordinate point 160 in spite of the fact that neither point is the correct match.

Figure 5:
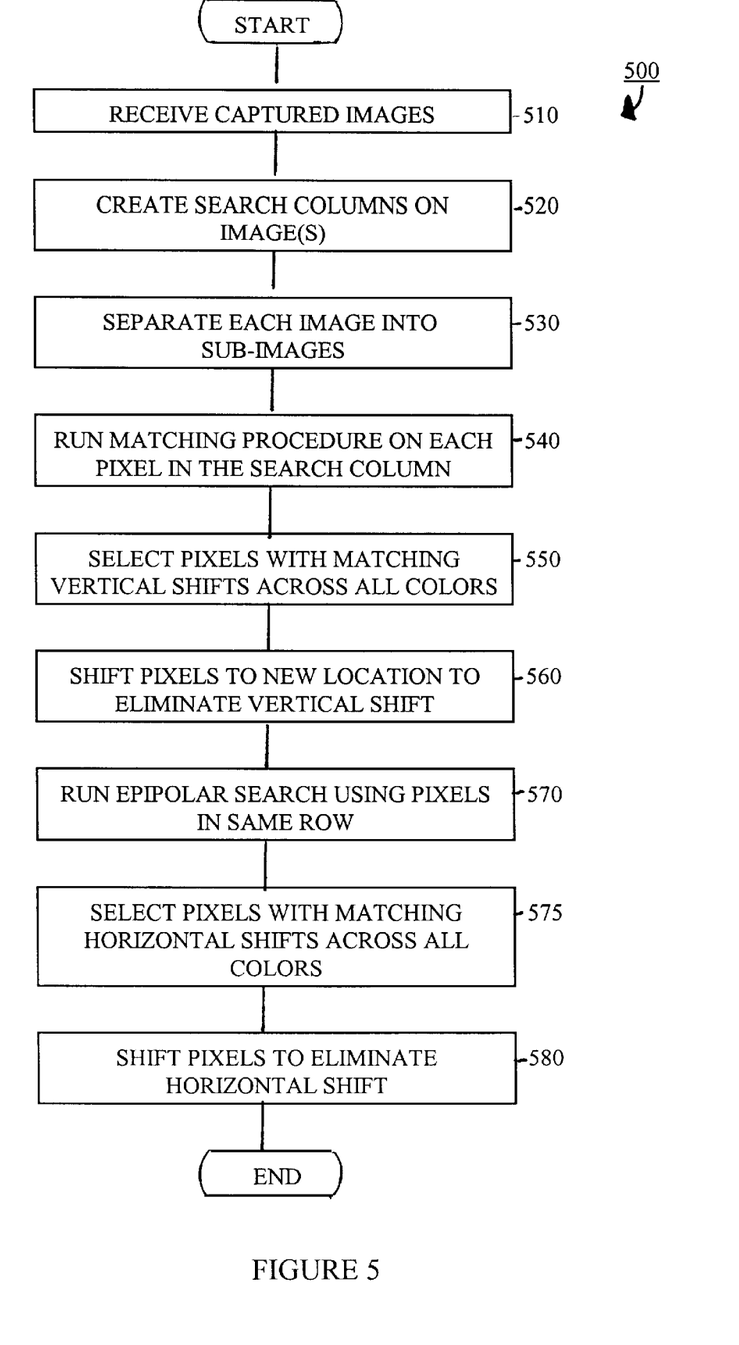
FIG. 5 is a flowchart illustrating the invented method for aligning images by adjusting epipolar lines using a search algorithm.

Referring now to FIG. 5, a flowchart illustrating the invented method 500 for aligning images by adjusting epipolar lines according to one embodiment of the present invention is shown. The method comprises: creating 520 two "search" columns on the first image 110; separating 530 each image 110,120 into gray-scale "sub-images" by splitting up each color coordinate into individual gray-scale components; running 540,570 a matching algorithm to identify matching points in the first and second sub-images; and using the matching points to adjust 560,580 the points in the images 110,120 so that the epipolar lines are parallel. Once these steps have been performed, the adjusted images can then be combined to form a single stereo image or used to assess spatial information about the object or scene captured in the image as desired.

In order to adjust the points with maximum accuracy while reducing the time required to correlate the points, the method nuns the matching algorithm for each color only along a subset of the total number of points in the images 110,120. In the preferred embodiment, two vertical columns are created 530 on the first image 110. Each vertical column comprises a column of one or more points that will be matched to a corresponding point in the other image 120. By creating these "matching columns", the matching algorithm can be run with greater accuracy while avoiding substantial processing times by limiting the range of points.

Preferably, these columns are located toward the edges of the image. For example, if the first image 110 captured the "left" side of the scene while the second image 120 captured the "right" side of the scene, then the column could be placed at right edge of the first image 110 as overlap is guaranteed. The second column must be placed more carefully to insure that the column overlaps with one or more matching points in the second image 120.

A variety of means can be used to guarantee overlap including a priori knowledge of the location of the capture devices or, if desired, the matching algorithm can be run on the first column and one or more horizontal shift calculations can be used to select a safe distance for the second column. For example, if the process is completed for the first column, the second column could be placed at twice the distance of the calculated horizontal shift.

Once the columns have been selected, the original images are separated 530 into their component parts. This is accomplished by separating 530 each image into gray scale "sub-images" using the value of each color coordinate as the corresponding gray-scale value. A standard format for points in a digital image is Red-Green-Blue (RGB) color coordinates that specify the amount of red, green and blue of the respective point. In this example, three sub-images, one for red, blue, and green, respectively, are created. For example, if a point in an image has the color coordinate (100,150, 200), then that point will have a gray scale value of 100 in the "red" sub-image, 150 in the "green" sub-image and 200 in the "blue" sub-image. These "sub-images" are generated from both images, resulting in a total of three sub-image pairs.

A matching algorithm is then rum 540 on each of the sub-image pairs. The points in the search column in the "green" sub-image of the first image 110 are compared to the points in a similar area in the green sub-image of the second image 120 using a matching algorithm. In the preferred embodiment, the matching algorithm described with reference to FIG. 2 may be used. Alternatively, any number of different matching algorithms may be used to match points.

This process is repeated for both the red and blue sub-images. If the points of the original image are RGB triplets, a total of three searches, one for each color coordinate, are performed for each point in the search column. Other types of color coordinates may also be used, however, so the number of searches performed will vary with the number of color coordinates. This process is repeated for the points in the second search column of the first image 110.

The search results in six sets of point pairs—the points in both search columns of the first image 110 paired with the matching points in the second image 120 for each coordinate sub-image. Each point pair has a vertical shift and a horizontal shift that is defined as the difference between the location of the point being matched in the first image 110 and the matching point in the second image 120. All of the point pairs having the same vertical shift across each of the sub-images are selected 550. For example, if the search of the "green" gray-scale sub-image matches point 1 to a point with a vertical shift of three, and matches point 2 with a point having a vertical shift of five; while the search of the "red" gray-scale sub-matches the same point 1 and point 2 with points having vertical shifts of seven and five respectively; then only point 2 is selected, as both searches located matching points with a vertical shift of five for the same point. Different vertical shift values may be calculated for points in the right and left search columns.

Ideally, an identical match of several points in each search column will be found. Because of the rigorous selection process, which only picks points that match each color coordinate individually and have a vertical shift identical to the other point pairs, it is very likely that points selected are accurate match points. It is possible to apply some additional filtering algorithm to the result, such as median filtering, for example, but that is not required to practice the present invention. Using a filtering algorithm may be particularly useful, however, if a priori information about possible distortions is available.

If maximum accuracy is desired, this process may be repeated to locate matching points in both directions. Thus, points in the search columns in the first image 110 are matched to points in the second image 120 and points in the search columns of the second image 120 are matched with points in the first image 110. In this case, the point pairs generated in the additional search should have the same magnitude vertical shift as the first set of point pairs except that the shift will be in the opposite direction. This additional step can provide a further guarantee that the correct vertical displacement was selected. In the event that the vertical shifts are not identical, a mid point between the vertical shifts can be used to align the images 110,120. The points in the columns containing the matching points are then adjusted 560 by the calculated vertical shift so that the matching points in both images are vertically aligned.

The next step 560 is to approximate the resulting shift of the areas between the matching columns and areas to the left and night of the matching columns. In the preferred embodiment, the approximations are performed using a mathematical function. In the simplest case the function is linear, so the vertical shift for each column between the matching columns are calculated by extrapolating a new value using the vertical shift of the left matching column and the vertical shift of the right matching column.

In the case of vertical alignments, there will often be shifts that are not an integer value. In these cases, a new color value for the point is calculated by the linear interpolation of the values of the nearest points. For example if the calculated shift is minus 3.5 points, then the average value of two consecutive points is placed in the location 3 points below the lower of the two points. In this example, the new value could be an average of the color coordinates of the two points. New values are calculated for each color coordinate point and these values substitute the values at the given point.

While this method 500 has been described using linear equations to correct for linear distortion, this method 500 can also correct nonlinear distortion. One or more additional columns, placed anywhere in the images, may be vised in this procedure. For example, if lens distortion tends to be more pronounced in the center of the image, 3 additional columns can be placed close to the center of the image, resulting in more precise approximation in that region of the image. Additionally, non-linear equations may be used to approximate shift across the image. Finally, different equations may be used to approximate the shift of different parts of the image. For example, the approximation could be linear for the middle and non-linear for the outer portions. In this way it is possible to correct lens distortion, which is not linear, and still keep the algorithm working fast.

Figure 6:
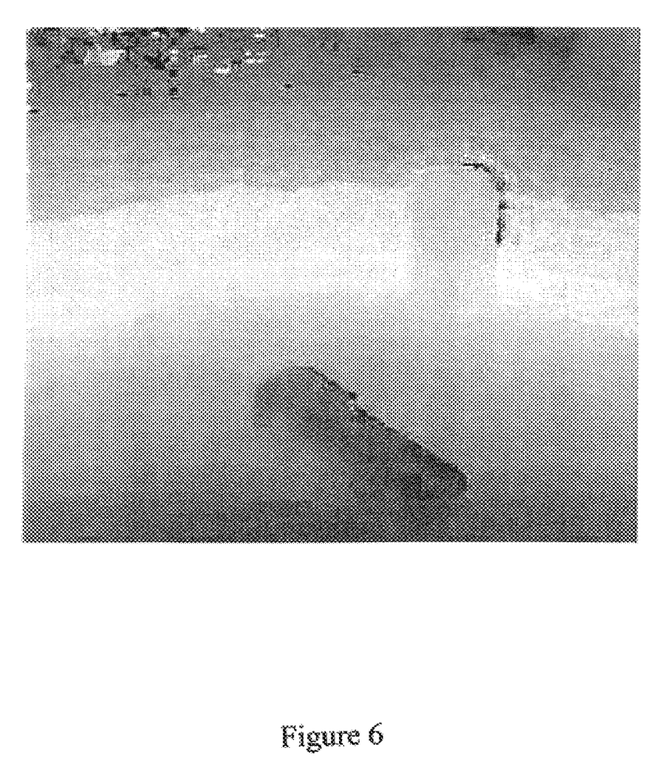
FIG. 6 provides a disparity map illustrating the improved results of applying the method of the present invention to the can and stapler image pair.

FIG. 6 illustrates the results of applying the method of the present invention to the "Can and Stapler" stereo pair. The calculated disparity field no longer has the errors in the central part of the image, in contrast to FIGS. 3 and 4. Additionally, the processing time of the method 500 was substantially quicker than direct application of the algorithm. Another advantage of the method is simultaneous correction of all three colors, while in the classical correlation technique we have to apply a time consuming algorithm for every color. The larger the image, the greater time saving and the better correction, because the larger image will have more detailed boundary shift approximations.

Figure 7:
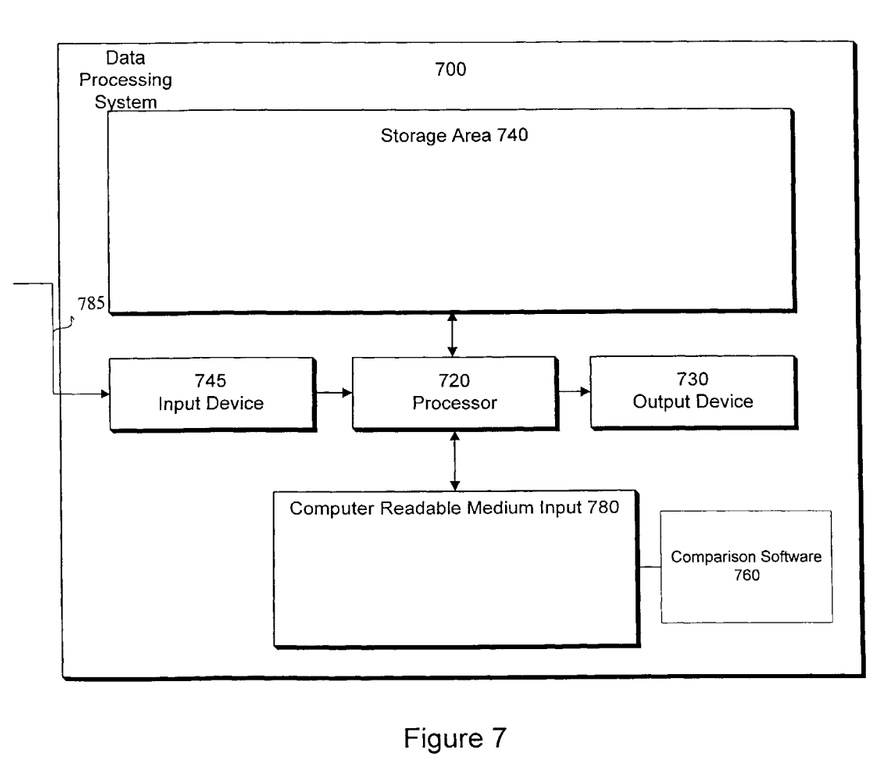
FIG. 7 is a block diagram of a data processing system that may be used to implement the inventions.

FIG. 7 is a block diagram of a data processing system 700, which has at least one processor 720 and storage 740. Storage 740 of system 700 includes one or more images, comparison software 760 and data structures used by the matching algorithm. The steps of the described embodiment of the present invention are performed when instructions of a computer program are performed by processor 720 (or another appropriate processor) executing instructions in storage 740.

System 700 also includes a network connection 785, which connects System 700 to a network such as the Internet, an intranet, a LAN, or a WAN. System 700 also includes an input device 745, such as a keyboard, touch-screen, mouse, or the like. System 700 also includes an output device 730 such as a printer, display screen, or the like. System 700 also includes a computer readable medium input device 780 for a computer readable medium. The computer readable medium can be any appropriate medium that has instructions such as those of comparison software 765 stored thereon. These instructions are loaded through computer readable medium input device 780 into storage area 740. Instructions can also be loaded into storage area 740 in the form of a carrier wave over network connection 785. Thus, the instructions and data in storage area 740 can be loaded into storage via an input device 780, via a network, such as the internet, a LAN, or a WAN, or can be loaded from a computer readable medium such as a floppy disk, CD ROM, or other appropriate computer readable medium. The instructions can also be downloaded in the form of a carrier wave over a network connection.

System 700 also includes an operating system (not shown). A person of ordinary skill in the art will understand that the storage/memory also contains additional information, such as application programs, operating systems, data, etc., which are not shown in the figure for the sake of clarity. It also will be understood that data processing system 700 (or any other data processing system described herein) can also include numerous elements not shown, such as additional data, software, and/or information in memory, disk drives, keyboards, display devices, network connections, additional memory, additional CPUS, LANS, input/output lines, etc.

Although the description above contains many detailed descriptions, these descriptions should not be construed as limiting the scope of the invention but merely as providing illustrations of some of the presently preferred implementations of this invention. For example, although this method was described with reference to a standard rectangular image, this method can be used to correct images of any shape or size. Additionally, although the method was described with reference to vertical columns, other regions and areas of the image may also be used to establish reference points. Thus the scope of the invention should be determined by the appended claims and their legal equivalents, rather than by examples given.

What is claimed is:

1. A method for aligning two original images of a scene, such that the images have at least some overlap area, said method comprising:

creating a left and a right search column on at least one of the original images, such that at least one of the columns includes at least part of the overlap area;

creating two sets of gray-scale sub-images, one set of sub-images for each of the two original images;

pairing the sub-images generated from the first original image with sub-images from the second original image such that a sub-image pair shares the same assigned color coordinate;

running a matching algorithm on each point in the right and left search column of each sub-image pair;

calculating vertical shift between points identified as matching by the matching algorithm;

selecting points with identical vertical shift values; and aligning the points that were not selected in the image by extrapolating the resulting calculated vertical shift values for each column.

2. The method of claim 1, wherein the step of creating search columns, comprising the sub-steps of:

creating one search column in a middle of the first image;

running the matching algorithm on at least one point within the search column such that the points are matched with at least one point in the second image;

calculating an average horizontal shift for the matched points;

responsive to a calculated horizontal shift value that matches points in the middle of the first image with points to the left of the middle of the second image, creating two search columns on the first image such that the left column is shifted by at least the calculated horizontal shift value from the edge of the first image and the right column is created to the right of the first column; and responsive to a calculated horizontal shift value that matches points in the middle of the first image with points to the right of the middle of the second image, creating two search columns on the first image such that the right column is shifted by at least the calculated horizontal shift value from the right edge of the first image and the left column is created anywhere to the left of the right column.

3. The method of claim 1, wherein running the matching algorithm comprises running a matching algorithm as described with reference to FIG. 2.

4. The method of claim 1, wherein running the matching algorithm comprises running a correlation-based matching algorithm.

5. The method of claim 1, wherein running the matching algorithm comprises running a feature-based matching algorithm.

6. The method of claim 1, wherein running the matching algorithm comprises running a phase-based matching algorithm.

7. The method of claim 1, wherein the step of aligning the remaining points comprises using an equation to calculate the shift values.

8. The method of claim 7, wherein the equation is linear.

9. The method of claim 7, wherein the equation is non-linear.

10. The method of claim 7, wherein one portion of the image is aligned using a linear equation and one portion of the image is aligned using a non-linear equation.

11. The method of claim 1, wherein the step of aligning the remaining points further comprises the steps of:

calculating a linear equation of the from mx+b, where m is equal to the difference between the shift values calculated for the left and right search columns divided by the number of points between the right and left search column and where b is equal to the calculated shift for the left column;

calculating a shift value for each column of the image using the calculated linear equation by replacing x with the number of columns between the left column and the column being shifted, such that columns to the left of the left column are assigned a negative x value;

shifting the points corresponding to that column by the value generated by the linear equation.

12. A system for aligning two original images of a scene, such that the images have at least some overlap area, said system comprising:

means for creating a left and a right search column on at least one of the original images such that at least one of the created columns includes at least part of the overlap area;

coupled to the means for creating a left and right search column, means for creating two sets of gray-scale sub-images, one set of sub-images for each of the two original images;

coupled to the means for creating two sets of grayscale images, means for pairing the sub-images generated from the first original image with sub-images from the second original image such that a sub-image pair shares the same assigned color coordinate;

coupled to the means for pairing, means for running a matching algorithm on each of the points in the search column of each sub-image pair;

coupled to the means for running the matching algorithm, means for calculating vertical shift between points between points identified by the matching algorithm;

coupled to the means for calculating, means for selecting points with identical calculated vertical shift values; and coupled to the means for selecting, means for aligning the points in the image that were not selected by the means for selecting by extrapolating the resulting calculated vertical shift values for each column.

13. The system of claim 12, wherein the means for creating search columns comprises:

means for creating one search column in a middle of the first image;

coupled to the means for creating, means for executing the matching algorithm on at least one point within the search column such that the point is matched with at least one point in the second image;

coupled to the means for executing the algorithm, means for calculating at least one average horizontal shift value for points located by the matching algorithm; and coupled to the means for calculating, means for using the calculated value to generate a linear equation.

14. The system of claim 12, wherein means for running the matching algorithm comprises means for running a matching algorithm as described with reference to FIG. 2.

15. The method of claim 12, wherein means for running the matching algorithm comprises means for running a correlation-based matching algorithm.

16. The system of claim 12, wherein the means for running the matching algorithm comprises means for running a feature-based matching algorithm.

17. The system of claim 12, wherein running the matching algorithm comprises means for running a phase-based matching algorithm.

18. The system of claim 12, wherein the means for aligning the remaining points comprises means for generating an equation to calculate the shift values.

19. The system of claim 18, wherein means for generating an equation comprises means for generating a linear equation.

20. The system of claim 18, wherein means for generating an equation comprises means for generating a non-linear equation.

21. The system of claim 18, wherein means for aligning comprises means for aligning one portion of the image using a linear equation and aligning the remaining portion of the image using a non-linear equation.

22. A computer-readable medium containing a computer program for aligning two images, said program containing instructions for directing the computer to execute the steps of:

creating a left and a right search column on at least one of the original images, such that at least one of the columns includes at least part of the overlap area;

creating two sets of gray-scale sub-images, one set of sub-images for each of the two original images;

pairing the sub-images generated from the first original image with sub-images from the second original image such that a sub-image pair shares the same assigned color coordinate;

running a matching algorithm on each point in the right and left search column of each sub-image pair;

calculating vertical shift between points identified as matching by the matching algorithm;

selecting points with identical vertical shift values; and aligning the points that were not selected in the image by extrapolating the resulting calculated vertical shift values for each column.

* * * * *

UNITED STATES PATENT AND TRADEMARK OFFICE
CERTIFICATE OF CORRECTION

PATENT NO. : 6,671,399 B1
DATED : December 30, 2003
INVENTOR(S) : Alexander Berestov It is certified that error appears in the above-identified patent and that said Letters Patent is hereby corrected as shown below:

Title page,
Item [57], ABSTRACT,
Line 3, "and" should be deleted.

Column 4,
Line 33, "flow" should read -- now --; and
Line 57, "aligned" should read -- align --.

Column 6,
Line 1, "nuns" should read -- runs --.

Column 7,
Line 38, "night" should read -- right --; and
Line 60, "vised" should read -- used --.

Column 10,
Line 8, "from" should read -- form --.;
Line 18, "value;" should read -- value; and --; and
Line 43, "between points" should be deleted.

Column 11,
Line 1, "method" should read -- system --.

Signed and Sealed this

Twenty-fourth Day of August, 2004

JON W. DUDAS
*Director of the United States Patent and Trademark Office*